United States Patent [19]

Farrow et al.

[11] Patent Number: 4,624,812

[45] Date of Patent: Nov. 25, 1986

[54] INJECTION MOLDABLE CERAMIC COMPOSITION CONTAINING A POLYACETAL BINDER AND PROCESS OF MOLDING

[75] Inventors: Gerry Farrow, New Providence; Anthony B. Conciatori, Chatham, both of N.J.

[73] Assignee: Celanese Corporation, New York, N.Y.

[21] Appl. No.: 752,489

[22] Filed: Jul. 8, 1985

Related U.S. Application Data

[63] Continuation of Ser. No. 459,744, Jan. 21, 1983, abandoned.

[51] Int. Cl.$^4$ ............................ C04B 35/64; C08K 3/00
[52] U.S. Cl. .................................. 264/63; 524/413; 524/430; 524/431; 524/443; 524/512; 524/593
[58] Field of Search ................... 264/63; 523/138, 139, 523/140, 141; 524/593, 512, 430, 431, 413, 443

[56] References Cited

U.S. PATENT DOCUMENTS

| | | | |
|---|---|---|---|
| 3,252,809 | 5/1966 | Somers et al. | 264/63 |
| 3,285,873 | 11/1966 | Bailey et al. | 264/63 |
| 3,340,219 | 9/1967 | Stemmler | 524/593 |
| 3,494,883 | 2/1970 | Holub et al. | 524/593 |
| 3,953,562 | 4/1976 | Hait et al. | 264/63 |

FOREIGN PATENT DOCUMENTS 793744 4/1958 United Kingdom ............... 524/593

OTHER PUBLICATIONS

Brandrup et al., Polymer Handbook, p. IV 207, Interscience Div of John Wiley and Sons, N.Y., N.Y., 1966.

*Primary Examiner*—James Derrington
*Attorney, Agent, or Firm*—Burns, Doane, Swecker & Mathis

[57] ABSTRACT

A ceramic composition suitable for injection molding comprises a ceramic powder and a binding agent in an amount effective to permit successful injection molding. The binding agent is comprised of a defined polyacetal which, upon heating, volatilizes evenly and completely thereby resulting in a sintered ceramic article without any latent defects or weak spots.

13 Claims, No Drawings

INJECTION MOLDABLE CERAMIC COMPOSITION CONTAINING A POLYACETAL BINDER AND PROCESS OF MOLDING

This application is a continuation of application Ser. No. 459,744 filed Jan. 21, 1983.

BACKGROUND OF THE INVENTION

1. Field of the Invention

The present invention relates to a ceramic composition containing a polyacetal binder. The composition is particularly suitable for injection molding. The present invention also relates to a process of molding using the described ceramic composition.

2. Description of the Prior Art

It is known in the art that moldable ceramic compositions may be formed by combining ceramic powders with various binding agents. For example, U.S. Pat. No. 4,071,594 discloses an extrudable ceramic composition comprising ceramic particles and a binding agent. The binding agent is a high molecular weight (at least 400,000) linear chain polyethylene oxide polymer with an organic solvent such a trichloroethylene or ethylene dichloride.

U.S. Pat. Nos. 4,301,020 and 4,267,065 describe ceramic compositions incorporating a dispersant to improve the rheological properties of a ceramic slurry. The dispersant comprises ammonium citrate and polyethylenimine.

U.S. Pat. No. 4,180,538 discloses a ceramic composition suitable for extrusion comprising an inorganic raw material powder and a plasticizer which is either a mono-liquid type resin, such as polyvinyl butyral resin, or a hydraulic setting resin mainly consisting of a polyurethane isocyanate prepolymer.

U.S. Pat. No. 3,309,212 relates to a ceramic slurry suitable for molding comprising ceramic particles distributed in a liquid binder such as ethyl silicate.

U.S. Pat. No. 3,496,256 describes a composition for molding refractory bodies comprising refractory particles admixed with a binding agent. The refractory particles may be metal oxides such as alumina, zirconia or magnesia. The binding agent is prepolymerized furfuryl alcohol.

Despite the disclosure of various materials employed as a binding agent for ceramic compositions, no known prior art discloses the binding agent of the present invention which enables readily moldable ceramic composition to be formed and which vaporizes from a molded composition upon subsequent heating without resulting in any defects or weak spots in the molded article.

OBJECTS AND SUMMARY OF THE INVENTION

Accordingly, it is a general object of the present invention to provide a novel ceramic composition which is superior to the ceramic compositions of the prior art.

It is another object of the present invention to provide an improved ceramic composition suitable for injection molding.

It is yet another object of the present invention to provide an improved ceramic composition suitable for injection molding which contains a binding agent that may be removed from the composition by heating such that it does not leave any defects or weak spots in the molded article.

It is a further object of the present invention to provide an improved ceramic composition suitable for injection molding which includes a binding agent comprised of a defined polyacetal.

It is a further object of the present invention to provide a process of molding a ceramic composition which includes a binding agent comprised of the defined polyacetal.

These and other objects, as well as the scope, nature and utilization of the invention will be apparent from the following summary and detailed description of the present invention.

In accordance with the one aspect, the present invention provides a ceramic composition suitable for injection molding. The composition comprises:

(a) a ceramic powder; and
(b) a binding agent in an amount effective to permit injection molding of the composition, said binding agent being comprised of a polyacetal having the recurring unit

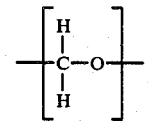

In another aspect, the present invention provides a process of molding a ceramic composition. The process comprises:

(a) mixing a ceramic powder with a binding agent comprised of a polyacetal having the recurring unit

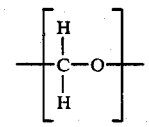

to form a ceramic composition;
(b) injection molding the composition;
(c) heating the injection molded composition to remove the binding agent; and
(d) sintering the composition.

DESCRIPTION OF THE PREFERRED EMBODIMENTS

As stated hereinabove, the present invention relates to a solvent free ceramic composition suitable for injection molding. The ceramic powder employed in the composition is selected according to the designed function of the molded article as is known to those with skill in the art. Typical ceramic powders include aluminum oxide ($Al_2O_3$, zirconium oxide (preferably calcium oxide-stabilized $ZrO_2$), silicon dioxide (preferably fused $SiO_2$), silicon nitride ($Si_3N_4$), silicon carbide (SiC), silicon, ferrite and mixtures thereof.

To obtain a sintered molded article which exhibits excellent characteristics, the ceramic powder should be selected and/or treated such that close packing of the powder particles may be obtained. In particular, important factors for particle packing are particle size distribution and the degree of agglomeration. To obtain optimum packing, a broad distribution of particle sizes is desirable as is well known to those having ordinary skill in the art. For example, an average diameter particle size ratio of at least about 7:1 will serve to improve the packing of the particles.

The degree of agglomeration is a function of the size of the individual particles. The smaller the particle size, the greater the surface attraction and strength of electrostatic forces which leads to a higher degree of agglomeration. While the specific particle size employed will depend on the chemical compound selected for the ceramic powder and the function of the molded article, the average particle size will typically be in the range of from about 0.1 to about 30 microns, preferably from about 0.5 to about 5 microns. The shape of the individual particles also effects agglomeration with spheres yielding the greatest density, cylindrical rods with slightly lowered density and dagger-shaped fibers with yet lower density.

In the interest of completeness, it should be pointed out here that powder packing is also affected by the particle array. However, since this is principally a random occurrence in the context of the present invention, a further discussion of this factor is not believed to be warranted.

In the event that the particles of the available ceramic powder are too large or are of a shape which yields a low packing density, treatment of the powder may lead to improved results. Such treatment may be accomplished through either wet or dry ball milling, jet milling with the particles propelled by gas to promote impact thereof, or other types of milling techniques whereby the particle size is reduced and the particle shape altered. Thus, for example, aluminum oxide available from Alcoa (designated A16SG) may be ball milled with 0.5% oleic acid to reduce the degree of agglomeration. Similarly, milling of needle-shaped particles of silicon nitride will improve the packing density. However, in this instance, care should be taken such that the degree of agglomeration of the milled silicon nitride is not increased to an extent whereby the overall improvement is negligible.

The ceramic composition of the present invention also includes a binding agent in an amount ranging from about 15 to 50% preferably from about 20 to about 35% by weight of the total mixture which serves to maintain the integrity of the shaped article prior to sintering. The binding agent is a polyacetal having the recurring unit

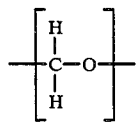

The term "polyacetal" and the recurring unit should be understood to encompass both homopolymers and copolymers which will be discussed in detail below.

The polyacetals employed in the present invention are per se known in the art. For example, polyacetals commercially available under the registered trademark Celcon may be prepared by polymerizing anhydrous formaldehyde or trioxane in accordance with the teachings of U.S. Pat. No. 3,027,352, the contents of which are hereby incorporated by reference.

The polyacetal binding agents of the present invention yield numerous advantages. In particular, since the polyacetals depolymerize through unzipping of the polymer chain, heating causes a uniform evolution of volatiles which removes the polyacetal binding agent without causing disruptions in the structure that might otherwise lead to defects or weak spots in the molded article. Additionally, the volatile material is a clean burning fuel that does not leave any undesirable or difficultly removable residue. Furthermore, the volatiles resulting from the polymerization of the polyacetal are generally not toxic and can be released with little or no treatment.

A yet further significant advantage of the use of polyacetals as the binding agent is that by selecting certain comonomers, copolymer binding agents may be tailored to the specific ceramic powder employed. More specifically, trioxane can be polymerized with ethylene oxide, dioxolane, substituted dioxolanes, trioxepane and 1,4-dioxane in amounts ranging from about 20 to about 80 mole % of the total comonomers present. Such copolymers can provide a lower melting point, lower crystallinity and increased softness and flexability. For instance, by copolymerizing dioxolane with trioxane in substantially equimolar proportions, a copolymer binding agent which is particularly suitable for aluminum oxide ceramic powder may be obtained.

The binding agent may also be comprised of small amounts of from about 1.0 to about 10% of known materials which serve an additional binding function. Such materials include low density polyethylene, atactic polypropylene, ethylene vinyl acetate and waxes such as stearic acid and paraffin wax.

In addition to the ceramic powder and the binding agent, the ceramic composition of the present invention may further contain conventional amounts of wetting agents, plasticizers and other types of processing aids which are added to the composition to obtain a suitable rheological system for molding. Specifically, from about 0.5 to about 2.0% by weight of wetting agents or surfactants can promote adhesion between the ceramic powder and the binding agent thereby reducing the degree of agglomeration. Suitable wetting agents or surfactants include lignite, mineral oil and low molecular weight waxes. Plasticizers in an amount of from about 1.0 to about 10% by weight decrease the viscosity of the composite to promote mixing. Typical plasticizers include waxes, silicones, alkyl phthalates, polyalkylene (e.g., polyethylene) glycols and linear saturated polyesters. Mold release agents in an amount of from about 0.05 to about 1.0% by weight prevent adhesion to the mold wall thereby facilitating removal of the shaped article from the mold. Typical mold release agents include silicones and various phthalates and amides such as Acrawax C (a fatty acid amide).

To mold the ceramic composition into shaped articles, the selected ceramic powder is initially dispersed or mixed in the binding agent. Also present at this time are any additives which are to be included in the composition. Mixing of the ceramic powder, the binding and any additives is performed in the absence of oxygen to preclude oxidation of the ceramic powder. This may be achieved by conducting the mixing operation in a vacuum or under an inert atmosphere such as nitrogen or argon.

To obtain a homogenous mixture, the components of the composition are first mixed in the substantial absence of shear at a temperature of from about room temperature to about 200° C. for from about 5 minutes to about 30 minutes. The composition is then sheared in this temperature range for from about 5 to about 30 minutes. If the mixture has been heated, it is thereafter cooled, while mixing under shear is continued. For example, the temperature is reduced from about 200° to about 170° C. The resulting mixture should have a viscosity of less than about 1,000 poise at a shear rate of 1,000 sec$^{-1}$ as measured by a capillary rheometer at a temperature in the range of from about 100° to about 300° C.

The mixture is next extruded at a die temperature in the range of from about 190° to about 220° C. and a pressure in the range of from about 500 to about 2000 psig. Extrusion can be achieved by various pieces of equipment known to those of ordinary skill in the art. For example, the equipment may be a twin-screw extruder operating at a die temperature of about 70° C. and a pressure of about 1200 psig.

Alternatively, a mixture-extruder may be employed which intimately mixes the components of the composition in a substantial absence of air and then extrudes the mixture.

Subsequent to the extrusion step, the extrudate is chipped or chopped to obtain pieces of the composition which are in the range of from about 1/16 to about ¼ inch in maximum dimension. While extrusion and chipping may be eliminated and the composition directly injection molded, it is preferably extruded and then chipped or chopped into pieces which may be readily fed into a hopper feeder of conventional injection molding machine. The chipped composition is then heated to a temperature from about 175° to about 200° C. and injected at a pressure in the range from about 500 to about 1000 psig. into a cold mold (i.e., from about room temperature to about 70° C.) where the composition hardens. Pressure is maintained on the composition until hardening is achieved. Typically, this requires from about 20 to about 60 seconds.

To remove the binding agent and any volatile additives, the molded composition is gradually heated. Although the rate and final temperature will depend on the amount and type of components in the composition and the characteristics of the article, a typical rate of temperature increase will range from about 5° to about 20° C. per hour until a temperature in the range of from about 20° to about 300° C. is reached. The selected temperature is then maintained for from about 0.5 to about 2.0 hours.

The temperature is then raised to that required for sintering the ceramic powder. While the rate of final temperature will naturally depend upon the characteristics of the ceramic powder and the shaped article, a rate of temperature increase will generally be in the range of from about 50 to about 1000 degrees per hour until a temperature at a range from about 1000° to about 1800° C. is obtained. To fully sinter the ceramic powder, the shaped article is held at final temperature for about 15 minutes to about 8 hours. Sintering is generally undertaken in an atmosphere composed of air or an inert gas. Sintering of the articles results in volumetric reduction of about 15 percent.

By the present invention, various sintered articles may be prepared. Such articles include electrical insulators, furnace elements, crucibles, heat exchange tubes, molds and cores for metal casting and other applications known to those of ordinary skill in the art.

To obtain a more complete understanding of the present invention, the following examples of preparing shaped molded articles is set forth. It should be understood, however, that the invention is not limited to the specific details set forth therein.

EXAMPLE 1

20 grams of polyacetal (Celcon ® Grade M-9001 having a melting point of about 165° C.) is charged into a mixer at 200° C. with a slight nitrogen sweep. Sigma blades are rotated at 40 r.p.m. while 75 to 85 grams of aluminum powder (1 micron average diameter) is added.

After 15 minutes, the mixture is removed from the mixture and a 0.08 strand is extruded under pressure at 200° C. The strand is placed in a furnace and heated to 300° C. in about 30 minutes. This effects a quantitative removal of the binder.

Sintering is carried out in a furnace at 1800° C. and results in an integral article having acceptable properties.

EXAMPLE 2

The procedure of Example 1 is repeated with the exception that the binding agent is a copolymer composed of 50 parts of trioxane and 50 parts of dioxolane. The binding agent exhibits a melting point of about 140°–150° C. and hence the mixture containing the ceramic powder can be processed at a lower temperature.

Upon sintering at 1800° C., an acceptable article is again obtained.

Although the invention has been described with preferred embodiments, it is to be understood that variations and modifications may be resorted to as will be apparent to those skilled in this art. Such variations are to be considered within the scope of the following claims.

We claim:

1. A solvent-free ceramic composition suitable for injection molding and sintering consisting essentailly of:
   (a) a ceramic powder
   (b) a binding agent in an amount effective to permit injection molding of the composition and ranging from about 20 to about 35% by weight of the composition, said binding agent being comprised of at least 90% by weight of a polyacetal having the recurring unit.

2. The ceramic composition of claim 1 wherein the ceramic powder is selected from the group consisting of aluminum oxide, zirconium oxide, silicon dioxide, silicon nitride, silicon carbide, silicon, ferrite and mixtures thereof.

3. The ceramic composition of claim 1 wherein binding agent further contains a material selected from the group consisting of low density polyethylene, atactic polypropylene, ethylene vinyl acetate, waxes and mixtures thereof.

4. The ceramic composition of claim 1 which further comprises from about 0.5% to about 2.0% by weight of a wetting agent.

5. The ceramic composition of claim 1 which further comprises from about 1.0 to about 10% by weight of a plasticizing agent.

6. A process of molding and sintering a ceramic composition comprising:
   (a) preparing a solvent-free ceramic composition suitable for injection molding and sintering consisting essentially of a ceramic powder and binding agent in an amount effective to permit injection molding of the composition and ranging from about 15 to about 50% by weight of the composition, said binding agent being comprised of at least 90% by weight of a polyacetal having the recurring unit

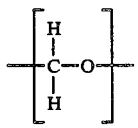

(b) injection molding the composition;
(c) heating the injection molded composition to remove the binding agent; and
(d) sintering the composition.

7. The process of claim 6 wherein the polyacetal comprises from about 20 to about 35% by weight of the mixture 8. The process of claim 6 wherein the ceramic powder is selected from the group consisting of aluminum oxide, zirconium oxide, silicon dioxide, silicon nitride, silicon carbide, silicon, ferrite and mixtures thereof.

9. The process of claim 6 wherein prior to the extruding step, the composition exhibits a viscosity of less than 1000 poise at a shear rate of 1,000 $sec^{-1}$ within a temperature range of from about 100° to about 300° C.

10. The process of claim 6 wherein the binding agent is removed by heating to a temperature in the range of from about 20° to about 300° C. for from about 0.5 to about 2.0 hours.

11. The process of claim 6 wherein the injection molded composition is sintered at a temperature in the range of from about 1000° to about 1800° C.

12. The process of claim 1 wherein the mixture is extruded and chipped prior to being injection molded.

13. A solvent free ceramic composition suitable for injection molding and sintering consisting essentially of:
(a) a ferrite powder
(b) a binding agent in an amount effective to permit injection molding of the composition and ranging from about 15 to about 50% by weight of the composition, said binding agent being comprised of at least 90% by weight fo a polyacetal having the recurring unit:

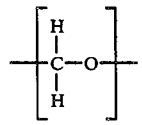

* * * * *